(12) United States Patent
Hoehler

(10) Patent No.: US 7,024,570 B2
(45) Date of Patent: Apr. 4, 2006

(54) LOW-POWER INDICATOR

(75) Inventor: Rainer Hoehler, Durham, NC (US)

(73) Assignee: Infineon Technologies North America Corp., San Jose, CA (US)

( * ) Notice: Subject to any disclaimer, the term of this patent is extended or adjusted under 35 U.S.C. 154(b) by 516 days.

(21) Appl. No.: 10/274,245

(22) Filed: Oct. 18, 2002

(65) Prior Publication Data

US 2004/0078611 A1 Apr. 22, 2004

(51) Int. Cl.
*G11C 7/00* (2006.01)

(52) U.S. Cl. ....................................... 713/310
(58) Field of Classification Search ................. 713/310
See application file for complete search history.

(56) References Cited

U.S. PATENT DOCUMENTS

| | | | | |
|---|---|---|---|---|
| 5,226,006 | A | * | 7/1993 | Wang et al. ........... 365/189.01 |
| 5,365,487 | A | * | 11/1994 | Patel et al. ................. 365/226 |
| 6,144,219 | A | * | 11/2000 | Palaniswami ................ 326/33 |
| 2001/0043493 | A1 | * | 11/2001 | Fujioka et al. ......... 365/189.09 |
| 2002/0051382 | A1 | * | 5/2002 | Matsubara et al. ..... 365/185.08 |

OTHER PUBLICATIONS

Fan, X., Ellis, C.S., Lebeck, A.R., "Memory Controller Policies for DRAM Power Management," ISLPED '01, Aug. 6-7, 2001, Huntington Beach, CA, USA © 2001 ACM 1-58113-371-5/01/0008.
Lebeck, A.R., Fan, X., Zeng, H., Ellis, C., "Power Aware Page Allocation," Proc. Of Ninth Internat'l Conf. On Arch. Support for Programming Languages and Operating Systems (ASPLOS-IX), Nov., 2000. © ACM 2000.

* cited by examiner

*Primary Examiner*—John R. Cottingham
(74) *Attorney, Agent, or Firm*—Brinks Hofer Gilson & Lione

(57) ABSTRACT

A random access memory with a low power mode indicator. The random access memory includes a state machine for generating a power mode output signal. A power mode pin control circuit is connected to the state machine for receiving the power mode output signal. A power mode pin is connected to the power mode pin control circuit for providing an output indicative of the power mode output signal received from the state machine.

35 Claims, 2 Drawing Sheets

LOW-POWER INDICATOR

FIELD OF THE INVENTION

The present invention relates generally to memory chips and more—particularly, to a dynamic random access memory ("DRAM") having an output pin for indicating a low power mode state.

BACKGROUND OF THE INVENTION

One of several challenges facing memory chip designers is to develop memory chips that minimize power consumption. As such, energy efficiency has become an important item for optimization in memory chips. Mobile devices need memory chips that are capable of extending battery life by not consuming as much power and desktop systems need to reduce power to meet noise or power consumption limitations. Memory chips are consuming an increasing amount of the allowable power allocation in computing devices and thus, efforts are being made to reduce power consumption and increase energy efficiency.

Memory chip manufacturers are attempting to meet this demand for energy efficient memory chips by manufacturing memory chips capable of operating in multiple power modes such as active, standby, power-down and deep-power-down. In order to process a memory request, the memory chip must be in active mode. Traditionally, the remaining modes are in the order of decreasing power consumption. As such, standby mode consumes more power than power-down mode and deep-power-down mode consumes the least amount of power. Each of these power modes also requires an increased amount of time to transition back to active mode. Therefore, it takes less time for a memory chip to return to active mode from standby mode than it does for a memory chip to return to active mode from power-down mode.

Placing memory chips in lower power states when they are not in use by the computing device system using the memory chip can increase energy efficiency. In prior art systems, the challenge for system designers has been to use these modes effectively to reduce power consumption. As such, external memory controllers must be programmed to set the memory chips in low power modes when not in use. This requires designers to spend a considerable amount of time and effort developing code and designs that are capable of accurately knowing when to place the memory chips into the various low power modes.

A memory chip that can change power modes without the assistance of an external memory controller is disclosed in U.S. application Ser. No. 10/252,153, entitled Automatic Low-Power State Entry to the same named inventor, and is hereby incorporated by reference in its entirety. In this case, the memory controller must be informed that such a change took place in the memory chip. This is especially true for applications with a point-to-point connection where only one memory controller and one memory chip are involved. As such, a need exists for a memory chip that is capable of informing a memory controller of entry into a low power mode.

SUMMARY OF THE INVENTION

A preferred embodiment of the present invention discloses a random access memory having a low power mode indicator. The preferred random access memory includes a state machine that is operable to generate a power mode output. The power mode output is an indication of the current power mode that the random access memory is operating in. A power mode pin control circuit is connected to the state machine for receiving the power mode output. A power mode pin is connected to the power mode pin control circuit for providing an output indicative of the power mode output that is received from the state machine. As such, the preferred random access memory includes a power mode pin that can be used by peripheral devices to determine if the random access memory is operating in a low power mode.

In the preferred embodiment, the power mode pin control circuit includes a power mode decoder that is connected to a power mode output signal generator. The power mode decoder is also connected to the state machine and the power mode output signal generator is also connected to the power mode pin. During operation, the power mode decoder receives an output signal from the state machine that is indicative of the power mode the random access memory is operating in. The power mode decoder is used to decode this output signal from the state machine and cause the power mode output signal generator to generate an output on the power mode pin that indicates the current power mode of the random access memory.

In another preferred embodiment, the random access memory includes a register that is used for storing a power mode variable indicative of a current power mode of the random access memory. The contents of the register can be read out of the random access memory and used by an external memory controller to place the random access memory in a different power mode. The output that is generated on the power mode pin is indicative of a power mode that the random access memory is operating in that may be selected from a group of power modes including an active mode, a standby mode, a power-down mode and a deep-power-down mode.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
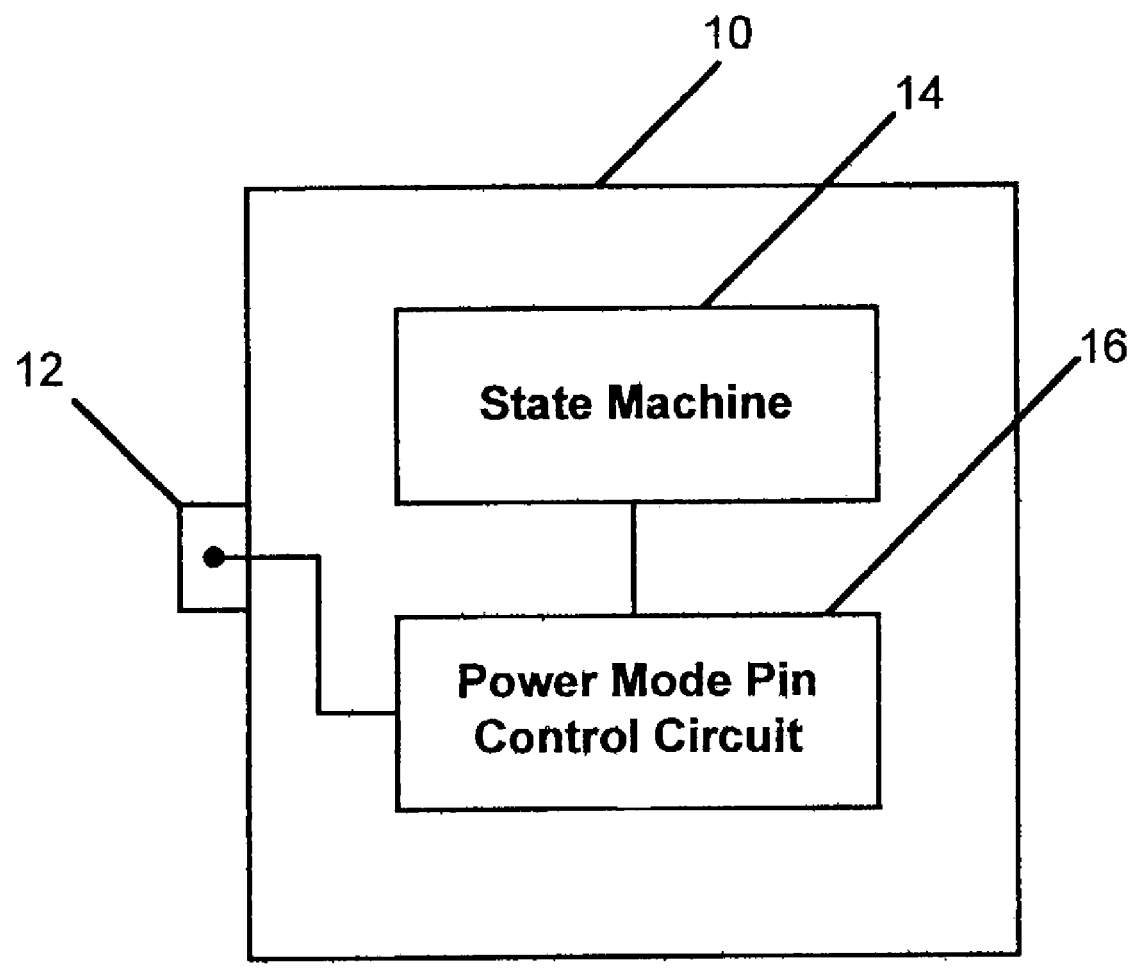
FIG. 1 illustrates a preferred random access memory with a low power mode indicator pin.

Referring to FIG. 1, a preferred embodiment of the present invention discloses a random access memory ("RAM") 10 that is capable of providing a low power mode indication through at least one power mode pin 12. The preferred RAM 10 is illustrated as a dynamic random access memory ("DRAM") in FIG. 1. However, those skilled in the art of memory chips should recognize that the presently disclosed invention could be incorporated into other RAM chips such as static random access memory ("SRAM"). In the preferred embodiment of the present invention, the RAM 10 is capable of automatically entering a power-down mode after a predetermined period of time as disclosed in Automatic Low-Power State Entry.

As illustrated in FIG. 1, the preferred RAM 10 includes a state machine 14 that is connected to a power mode pin control circuit 16. During operation, the state machine 14 generates an output signal that is indicative of the power mode that the RAM 10 is operating in. The output signal from the state machine 14 is supplied to the power mode pin control circuit 16. The power mode pin control circuit 16 is responsible for generating an output signal on the power mode pin 12 that is indicative of the power mode that the RAM 10 is currently operating in. The output signal from the state machine 14 is used by the power mode pin control circuit 16 to determine the type of output signal that should be generated on the power mode pin 12 of the RAM 10.

Figure 2:
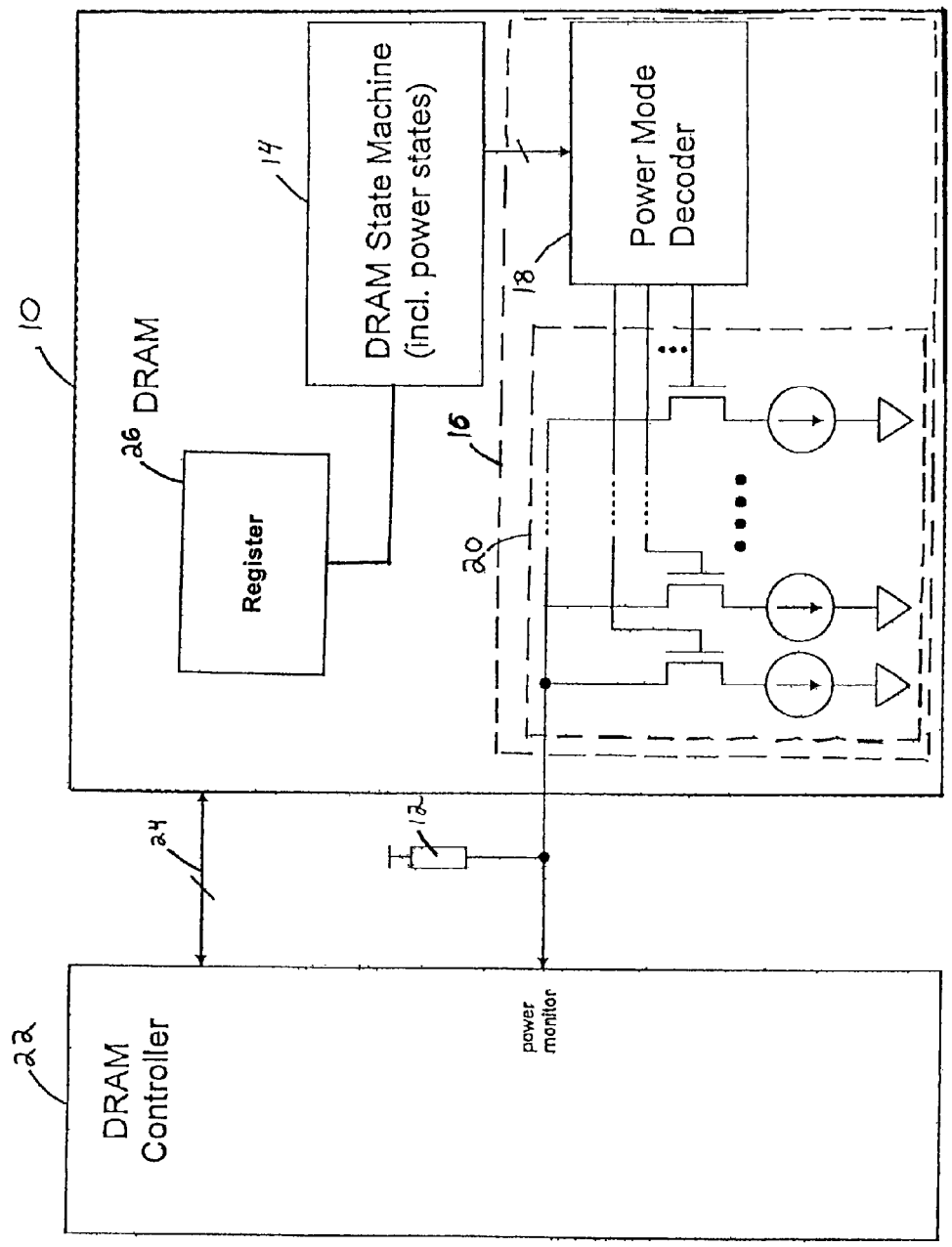
FIG. 2 is a more detailed illustration of the random access memory illustrated in FIG. 1.

Referring to FIG. 2, the power mode pin control circuit 16 preferentially includes a power mode decoder 18 and a power mode output signal generator 20. The power mode decoder 18 is connected to the power mode output signal generator 20. The power mode output signal generator 20 is fabricated to be connected to the power mode pin 12, which is preferentially located outside a package containing the circuitry that is included in the RAM 10. During operation, the state machine 14 is operable to generate an output that causes the power mode decoder 18 to generate an indication of entry into a low power mode that is output on the power mode pin 12. In the preferred embodiment, the RAM 10 is capable of operating in various power modes that include an active mode, a standby mode, a power-down mode and a deep-power-down mode.

As set forth above, the RAM 10 disclosed in this embodiment of the present invention includes a power mode pin 12 that is capable of generating an output signal indicative of the current power mode that the RAM 10 is operating in. For the purpose of the present invention, a power-down mode is defined as any mode in which no direct access from an external memory controller 22 is possible. In each power-down mode, the external memory controller 22 must send commands to the RAM 10 to "wake it up" into active mode before it can access the RAM 10. As known in the art, attached to a power-down mode is a certain delay before the RAM 10 can be accessed for activate/read/write commands.

In one preferred embodiment of the present invention, several different power-down modes can be indicated by different voltage levels that are driven at the power mode pin 12. In another illustrative embodiment of the present invention, the power mode pin 12 is actively driven (either logic high or logic low, depending upon architecture) when the RAM 10 is in active mode and not in any power-down mode. In the case of a power-down mode, the power mode pin 12 is either driven to the opposite value or not driven at all (e.g. in a deep-power down mode). In another embodiment, the distinction may include a proper termination (e.g. resistive termination with open drain).

Referring to FIG. 2, the RAM 10 may also be capable of storing a status indication of the actual operating power mode (in case different power modes exist) in a register 26 located in the RAM 10. As illustrated in FIG. 2, the external memory controller 22 is connected to the RAM 10 by a control bus 24. The control bus 24 allows the external memory controller 22 to control the RAM 10 and read and write data to and from the RAM 10. The external memory controller 22 is therefore capable of reading out the status of the register 26 to determine the current operating power mode of the RAM 10.

As set forth above, in this particular embodiment the external memory controller 22 is capable of reading out the status of the register to determine the actual power mode the RAM 10 is operating in. This allows the external memory controller 22 to determine the actual commands that need to be used to place the RAM 10 in active mode depending on the current power-down mode of the RAM 10. In another embodiment of the present invention, if several power-down modes are used more than one output pin 12 may be used with binary signal levels to identify the power mode, which makes the entry in the register 26 redundant. As set forth above, the four preferred power modes that the RAM 10 can operate in are active, standby, power-down or deep-power-down mode.

In yet another preferred embodiment, several RAM 10 chips may be connected to the external memory controller 22. Although not illustrated, in this preferred embodiment the power mode pins 12 from each RAM 10 chip may be connected to an OR gate. The output of the OR gate may then be connected to the external memory controller 22. The external memory controller 22 then must read out which RAM 10 chips are operating in which power mode states.

While the invention has been described in its currently best-known modes of operation and embodiments, other modes, embodiments and advantages of the present invention will be apparent to those skilled in the art and are contemplated herein. Although those skilled in the art would recognize that other embodiments of the present invention are envisioned, it is the claims that follow that that define the broad scope of the present invention.

What is claimed is:

1. A random access memory having a low power mode indicator, comprising:
    a state machine for generating a power mode output;
    a power mode pin control circuit connected to the state machine for receiving the power mode output; and
    a power mode pin connected to the power mode pin control circuit for providing an output indicative of the power mode output received from the state machine.

2. The random access memory of claim 1, where the power mode pin control circuit includes a power mode decoder connected to a power mode output signal generator.

3. The random access memory of claim 2, where the power mode decoder is connected to the state machine.

4. The random access memory of claim 2, where the power mode output signal generator is connected to the power mode pin.

5. The random access memory of claim 1, further including a register for storing a power mode variable indicative of a current power mode of the random access memory.

6. The random access memory of claim 1, where the output is generated using a digital logic level.

7. The random access memory of claim 1, where the output is generated as a voltage level.

8. The random access memory of claim 1, where the output is indicative of a power-down mode that may be selected from a group of power-down modes including a standby mode, power-down mode and deep-power-down mode.

9. A random access memory having a low power mode indicator, comprising:
    a state machine operable to generate a first power mode output signal;
    a power mode decoder connected to the state machine for monitoring the first power mode output signal;
    a power mode output signal generator connected to the power mode decoder for generating a second power mode output signal based on the first power mode output signal; and
    a power mode output pin connected to the power mode output signal generator.

10. The random access memory of claim 9, further including a register for storing a power mode variable indicative of a current power mode of the random access memory.

11. The random access memory of claim 9, where the second power mode output signal is generated as a digital logic output signal.

12. The random access memory of claim 9, where the second power mode output signal is generated as a voltage level, where a voltage value of the voltage level is indicative of a current power mode of the random access memory.

13. The random access memory of claim 9, where the second power mode output signal is indicative of a power-down mode that may be selected from a group of power-down modes including a standby mode, power-down mode and deep-power-down mode.

14. A random access memory with a low power mode indicator, comprising:
control means for generating a current power mode indication of the random access memory; and
power mode pin control means for monitoring the current power mode indication and generating a power mode output signal on a power mode pin based on the current power mode indication from the control means.

15. The random access memory of claim 14, where the control means comprises a state machine.

16. The random access memory of claim 14, where the power mode pin control means comprises a power mode pin control circuit.

17. The random access memory of claim 16, where the power mode pin control circuit includes a power mode decoder and a power mode output signal generator.

18. The random access memory of claim 14, further comprising storage means for storing a power mode variable indicative of a current power mode of the random access memory.

19. The random access memory of claim 18, where the storage means comprises a register.

20. The random access memory of claim 14, where the power mode output signal is generated as a digital logic output signal.

21. The random access memory of claim 14, where the power mode output signal is generated as a voltage level.

22. The random access memory of claim 14, where the power mode output signal is indicative of a power-down mode that may be selected from a group of power-down modes including a standby mode, power-down mode and deep-power-down mode.

23. A method of providing a power-down indicator in a random access memory, comprising the steps of:
generating a current power mode indication;
decoding the current power mode indication; and
generating a power mode output signal on a power mode pin based on the current power mode indication.

24. The method of claim 23, where the current power mode indication is generated by a state machine.

25. The method of claim 23, where the current power mode indication is decoded with a power mode decoder.

26. The method of claim 25, where the power mode decoder is connected to a state machine.

27. The method of claim 24, further comprising the step of updating a register based on the current power mode indication.

28. A low power mode indicator for a point-to-point connection between an external memory controller and a random access memory, comprising:
a state machine located in the random access memory for generating a power mode output;
a power mode decoder connected to the state machine in the random access memory for receiving the power mode output;
a power mode output generator connected to the state machine in the random access memory for generating a power mode output indication based on the power mode output from the state machine;
a power mode output pin connected to the power mode output generator and located on the random access memory; and
where the external memory controller is connected to the power pin for receiving the power mode output indication from the power mode output generator.

29. The method of claim 23, where the power mode output signal is generated with a power mode output signal generator.

30. A random access memory having a low power mode indicator, comprising:
a state machine for generating a power mode output;
a power mode pin control circuit connected to the state machine for receiving the power mode output;
a power mode pin connected to the power mode pin control circuit for providing an output indicative of the power mode output received from the state machine; and
a register for storing a power mode variable indicative of a current power mode of the random access memory.

31. A random access memory having a low power mode indicator, comprising:
a state machine for generating a power mode output;
a power mode pin control circuit connected to the state machine for receiving the power mode output; and
a power mode pin connected to the power mode pin control circuit for providing an output indicative of the power mode output received from the state machine,
wherein the output is generated using a digital logic level.

32. A random access memory having a low power mode indicator, comprising:
a state machine operable to generate a first power mode output signal;
a power mode decoder connected to the state machine for monitoring the first power mode output signal;
a power mode output signal generator connected to the power mode decoder for generating a second power mode output signal based on the first power mode output signal;
a power mode output pin connected to the power mode output signal generator; and
a register for storing a power mode variable indicative of a current power mode of the random access memory.

33. A random access memory having a low power mode indicator, comprising:
a state machine operable to generate a first power mode output signal;
a power mode decoder connected to the state machine for monitoring the first power mode output signal;
a power mode output signal generator connected to the power mode decoder for generating a second power mode output signal based on the first power mode output signal; and
a power mode output pin connected to the power mode output signal generator, wherein the second power mode output signal is generated as a digital logic output signal.

34. A random access memory with a low power mode indicator, comprising:
   control means for generating a current power mode indication of the random access memory;
   power mode pin control means for monitoring the current power mode indication and generating a power mode output signal on a power mode pin based on the current power mode indication from the control means; and
   storage means for storing a power mode variable indicative of a current power mode of the random access memory.

35. A random access memory with a low power mode indicator, comprising:
   control means for generating a current power mode indication of the random access memory; and
   power mode pin control means for monitoring the current power mode indication and generating a power mode output signal on a power mode pin based on the current power mode indication from the control means,
   wherein the power mode output signal is generated as a digital logic output signal.

* * * * *